United States Patent
Rodgers et al.

(10) Patent No.: US 10,193,879 B1
(45) Date of Patent: Jan. 29, 2019

(54) METHOD AND SYSTEM FOR SOFTWARE APPLICATION DEPLOYMENT

(71) Applicant: Cisco Technology, Inc., San Jose, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 14/705,847

(22) Filed: May 6, 2015

Related U.S. Application Data

(60) Provisional application No. 61/989,957, filed on May 7, 2014.

(51) Int. Cl.
*H04L 29/06* (2006.01)
*G06F 17/30* (2006.01)
*H04L 29/12* (2006.01)

(52) U.S. Cl.
CPC .... *H04L 63/0823* (2013.01); *G06F 17/30887* (2013.01); *G06F 17/30914* (2013.01); *H04L 61/1511* (2013.01)

(58) Field of Classification Search
CPC ............. H04L 61/1511; H04L 63/0823; H04L 63/168; H04L 67/02; H04L 2209/24;
(Continued)

(56) References Cited

U.S. PATENT DOCUMENTS

| 7,870,153 B2 | 1/2011 | Croft et al. |
| 7,886,023 B1 | 2/2011 | Johnson |

(Continued)

OTHER PUBLICATIONS

Office Action issued in related U.S. Appl. No. 14/705,589, dated Dec. 29, 2016 (29 pages).
(Continued)

*Primary Examiner* — Joseph P Hirl
*Assistant Examiner* — Sayed Aresh Beheshti Shirazi

(57) ABSTRACT

A method and system for deploying applications. The method includes deploying an application image of an application to a computing device, where the application is accessible using a first uniform resource locator (URL). The method also includes sending an application creation message to an authoritative domain name system (DNS) server to create a record mapping the first URL to a second URL. The first URL is in a first domain and the second URL is in a second domain. The method further includes providing, to the computing device, a digital certificate associated with the application. The method further includes generating certificate data using the digital certificate and sending, to a remote application server, the second URL and certificate data. A client software module may establish a connection to the application on the computing device using the second URL and the certificate data.

20 Claims, 11 Drawing Sheets

(58) Field of Classification Search
CPC ............... H04L 2209/64; H04L 61/305; H04L 63/0281; H04L 63/029; H04L 63/08; H04L 63/0853; H04L 63/145; H04L 63/18; H04L 67/141; H04L 9/3263; H04L 9/3271; G06F 21/55; G06F 21/567; G06F 2221/2107; G06F 8/61
See application file for complete search history.

(56) References Cited

U.S. PATENT DOCUMENTS

| | | | |
|---|---|---|---|
| 8,010,679 B2 | 8/2011 | Low et al. | |
| 8,051,180 B2 | 11/2011 | Mazzaferri et al. | |
| 8,166,261 B1 | 4/2012 | Cremelie et al. | |
| 8,218,828 B2 | 7/2012 | Iasso | |
| 8,438,654 B1 | 5/2013 | von Eicken et al. | |
| 8,572,400 B2 | 10/2013 | Lin et al. | |
| 8,588,233 B1* | 11/2013 | Lohner | H04L 61/2007 370/392 |
| 8,607,054 B2 | 12/2013 | Ramarathinam et al. | |
| 8,661,252 B2 | 2/2014 | Chandwani | |
| 8,959,108 B2 | 2/2015 | Pereira et al. | |
| 9,495,379 B2 | 11/2016 | Zhang et al. | |
| 2003/0212779 A1* | 11/2003 | Boyter | H04L 41/22 709/223 |
| 2005/0055456 A1 | 3/2005 | Chalupsky et al. | |
| 2007/0055703 A1* | 3/2007 | Zimran | G06F 17/30123 |
| 2007/0107046 A1* | 5/2007 | Jaeger | G06F 21/57 726/4 |
| 2007/0233698 A1* | 10/2007 | Sundar | G06F 8/60 |
| 2009/0063538 A1* | 3/2009 | Chitrapura | G06F 17/30887 |
| 2009/0248786 A1* | 10/2009 | Richardson | H04L 29/12066 709/201 |
| 2010/0058468 A1* | 3/2010 | Green | G06F 21/51 726/22 |
| 2010/0088367 A1* | 4/2010 | Brown | G06F 8/60 709/203 |
| 2010/0088405 A1 | 4/2010 | Huang et al. | |
| 2011/0072505 A1* | 3/2011 | Ott | G06F 8/61 726/11 |
| 2011/0162042 A1 | 6/2011 | Xiao et al. | |
| 2012/0066582 A1* | 3/2012 | Scoda | G06F 17/30905 715/234 |
| 2012/0117229 A1 | 5/2012 | Van Biljon et al. | |
| 2012/0151209 A1 | 6/2012 | Visnyak et al. | |
| 2013/0185715 A1 | 7/2013 | Dunning et al. | |
| 2013/0205376 A1 | 8/2013 | Narasimha et al. | |
| 2013/0238808 A1* | 9/2013 | Hallem | H04L 63/0281 709/227 |
| 2013/0262801 A1* | 10/2013 | Sancheti | G06F 3/065 711/162 |
| 2014/0101113 A1 | 4/2014 | Zhang et al. | |
| 2014/0123055 A1 | 5/2014 | Krleza | |
| 2014/0165147 A1* | 6/2014 | Hershberg | H04L 63/083 726/4 |
| 2014/0189808 A1* | 7/2014 | Mahaffey | H04L 63/083 726/4 |
| 2014/0281500 A1* | 9/2014 | Ignatchenko | H04L 9/3263 713/156 |
| 2014/0297779 A1 | 10/2014 | Pack et al. | |
| 2014/0344475 A1 | 11/2014 | Chen et al. | |
| 2015/0007250 A1 | 1/2015 | Dicato, Jr. et al. | |
| 2015/0100887 A1 | 4/2015 | Verkasalo | |
| 2015/0161282 A1* | 6/2015 | Low | G06F 17/30887 709/203 |
| 2015/0215308 A1* | 7/2015 | Manolov | H04L 63/0823 709/229 |
| 2015/0254451 A1* | 9/2015 | Doane | G06F 21/44 726/1 |
| 2016/0004859 A1* | 1/2016 | Goodes | G06F 21/57 726/17 |
| 2016/0021055 A1 | 1/2016 | Krzywonos et al. | |
| 2016/0119365 A1* | 4/2016 | Barel | H04L 63/1408 726/12 |
| 2016/0127407 A1* | 5/2016 | Mankovskii | H04L 63/1433 726/1 |

OTHER PUBLICATIONS

Office Action issued in the related U.S. Appl. No. 14/705,539, dated Oct. 6, 2017 (18 pages).
Office Action issued in the related U.S. Appl. No. 15/054,749, dated Nov. 30, 2017 (40 pages).

* cited by examiner

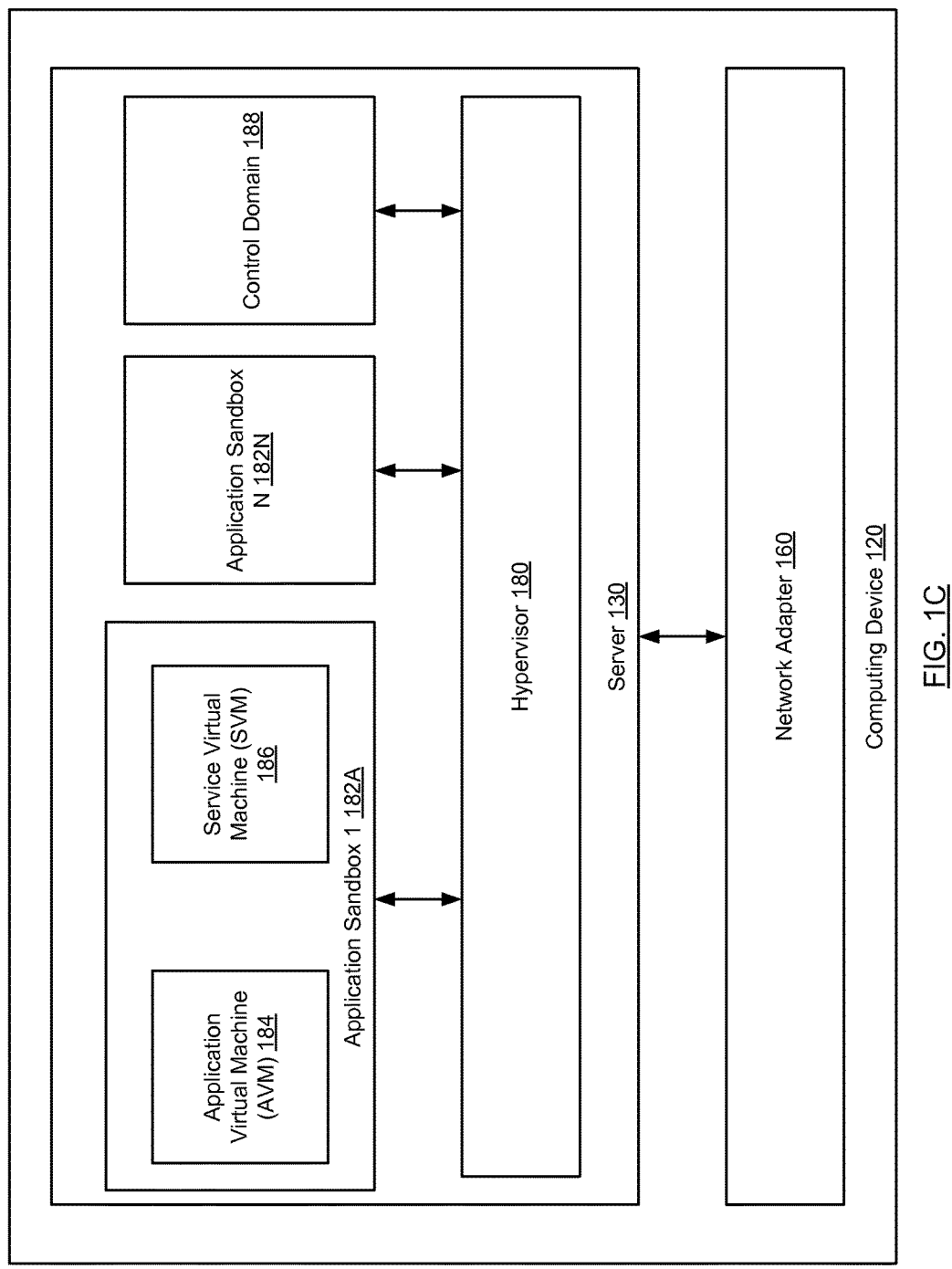

METHOD AND SYSTEM FOR SOFTWARE APPLICATION DEPLOYMENT

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Software applications may be deployed on remotely managed computing devices. The software applications may require digital certificates to interact with various applications.

SUMMARY

In general, in one aspect, the invention relates to a method for deploying applications. The method includes deploying an application image of an application to a computing device, where the application is accessible using a first uniform resource locator (URL). The method also includes sending an application creation message to an authoritative domain name system (DNS) server to create a record mapping the first URL to a second URL. The first URL is in a first domain and the second URL is in a second domain. The method further includes providing, to the computing device, a digital certificate associated with the application. The method further includes generating certificate data using the digital certificate and sending, to a remote application server, the second URL and certificate data. A client software module may establish a connection to the application on the computing device using the second URL and the certificate data.

In general, in one aspect, the invention relates to a non-transitory computer readable medium including computer readable program code, which when executed by a computer processor enables the computer processor to deploy an application image of an application to a computing device, where the application is accessible using a first uniform resource locator (URL). The method also includes sending an application creation message to an authoritative domain name system (DNS) server to create a record mapping the first URL to a second URL. The first URL is in a first domain and the second URL is in a second domain. The method further includes providing, to the computing device, a digital certificate associated with the application. The method also includes generating certificate data using the digital certificate and sending, to a remote application server, the second URL and the certificate data. A client software module may establish a connection to the application on the computing device using the second URL and the certificate data.

In general, in one aspect, the invention relates to a method for deploying applications. The method includes deploying an application image of an application to a computing device, where the application is accessible using a uniform resource locator (URL). The method further includes sending an application creation message to an authoritative domain name system (DNS) server to create a record mapping the URL to an Internet Protocol (IP) address associated with the computing device, where the URL is in a domain and the authoritative DNS is not the authoritative DNS server for the domain. The method also comprises providing, to the computing device, a digital certificate associated with the application. The method further comprises generating certificate data using the digital certificate and sending, to a remote application server, the URL and the certificate data. A client software module may establish a connection to the application on the computing device using the URL and the certificate data.

Other aspects of the invention will be apparent from the following description and the appended claims.

BRIEF DESCRIPTION OF DRAWINGS

FIGS. 1A-1C show systems in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-7C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to deploying a software application on a remotely managed computing device in a manner that protects a digital certificate affiliated with the software application from unauthorized access during the deployment and subsequently during the operation of the software application. In one embodiment of the invention, the software application and the affiliated certificate may be deployed on the computing device, which is part of an enterprise computing facility, by a management service that is used to manage the computing device.

Figure 1A:
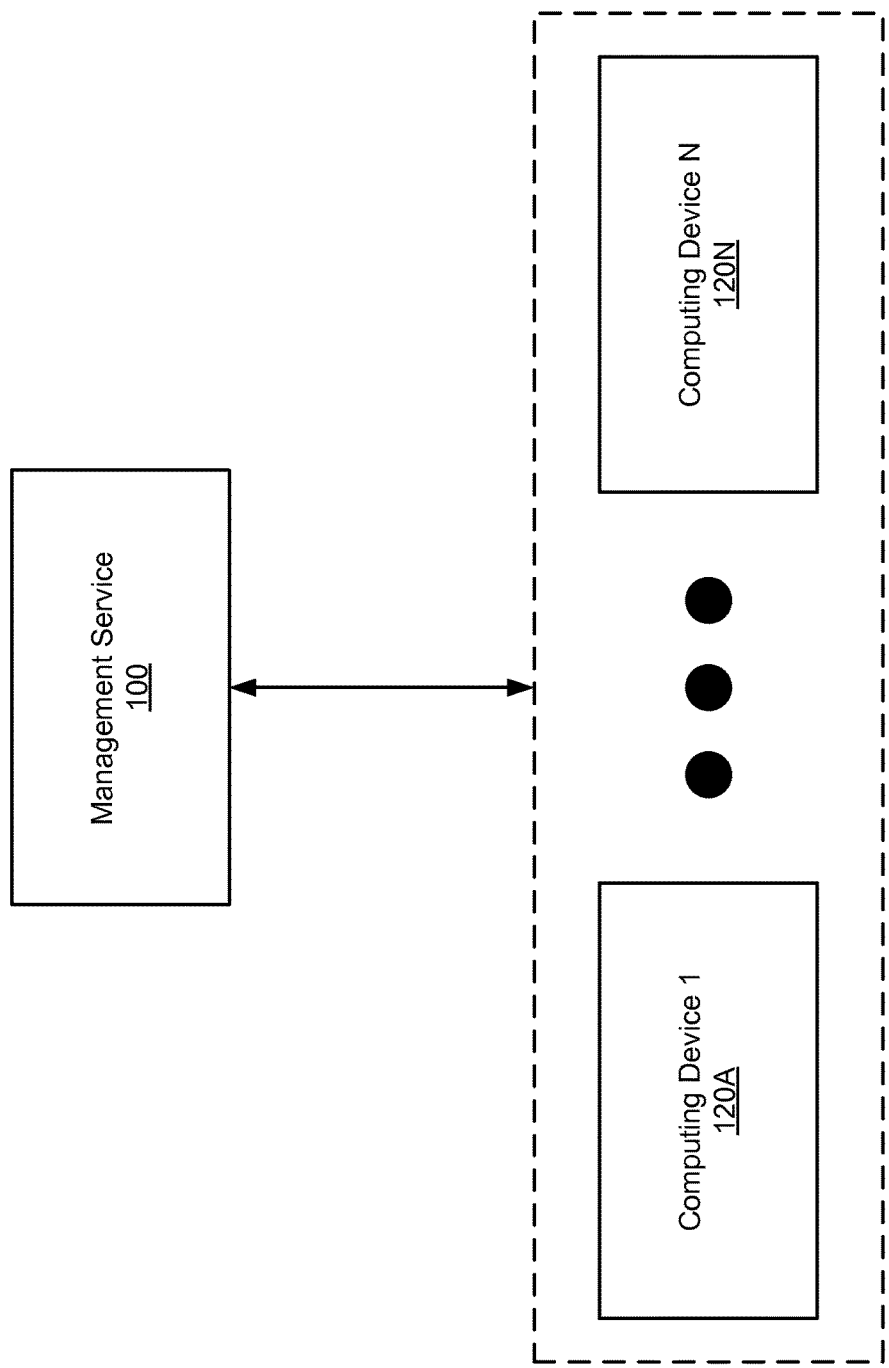

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 5 and 6).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

Figure 1B:
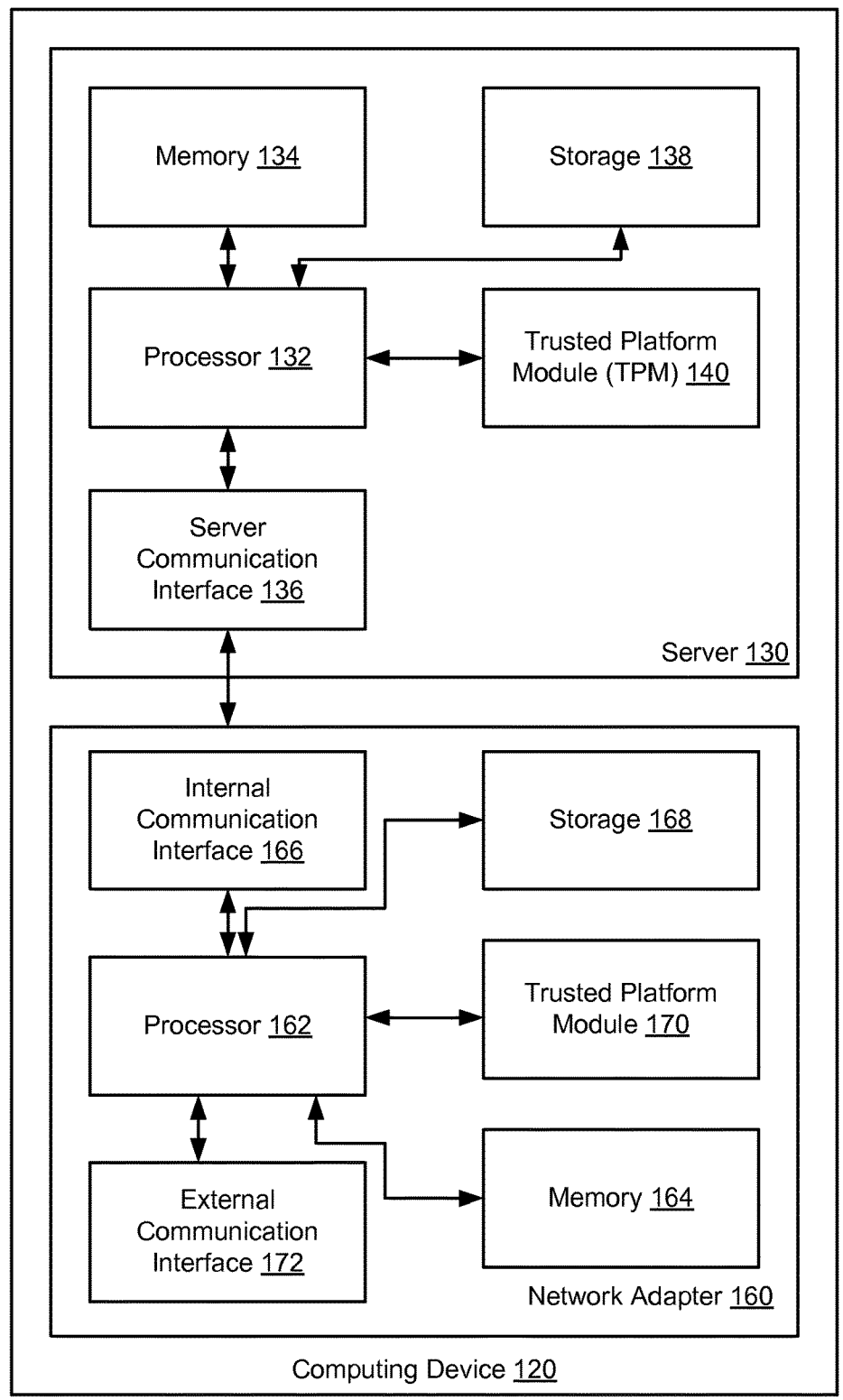

FIG. 1B shows a system in accordance with one or more embodiments of the invention. In one or more embodiments of the invention, computing device (120) includes two components: a server (130) and a network adapter (160). Each of these components is described below.

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain. Additional details about the various proxy services are provided below (see e.g., FIGS. 4 and 7A-7C).

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen® hypervisor (the mark is a registered trademark of Citrix, Santa Clara, Calif.), a kernel-based virtual machine (KVM), vSphere ESXi® (the mark is a registered trademark of VMware, Palo Alto, Calif.), or Hyper-V® (the mark is a registered trademark of Microsoft, Redmond, Wash.).

Figure 2:
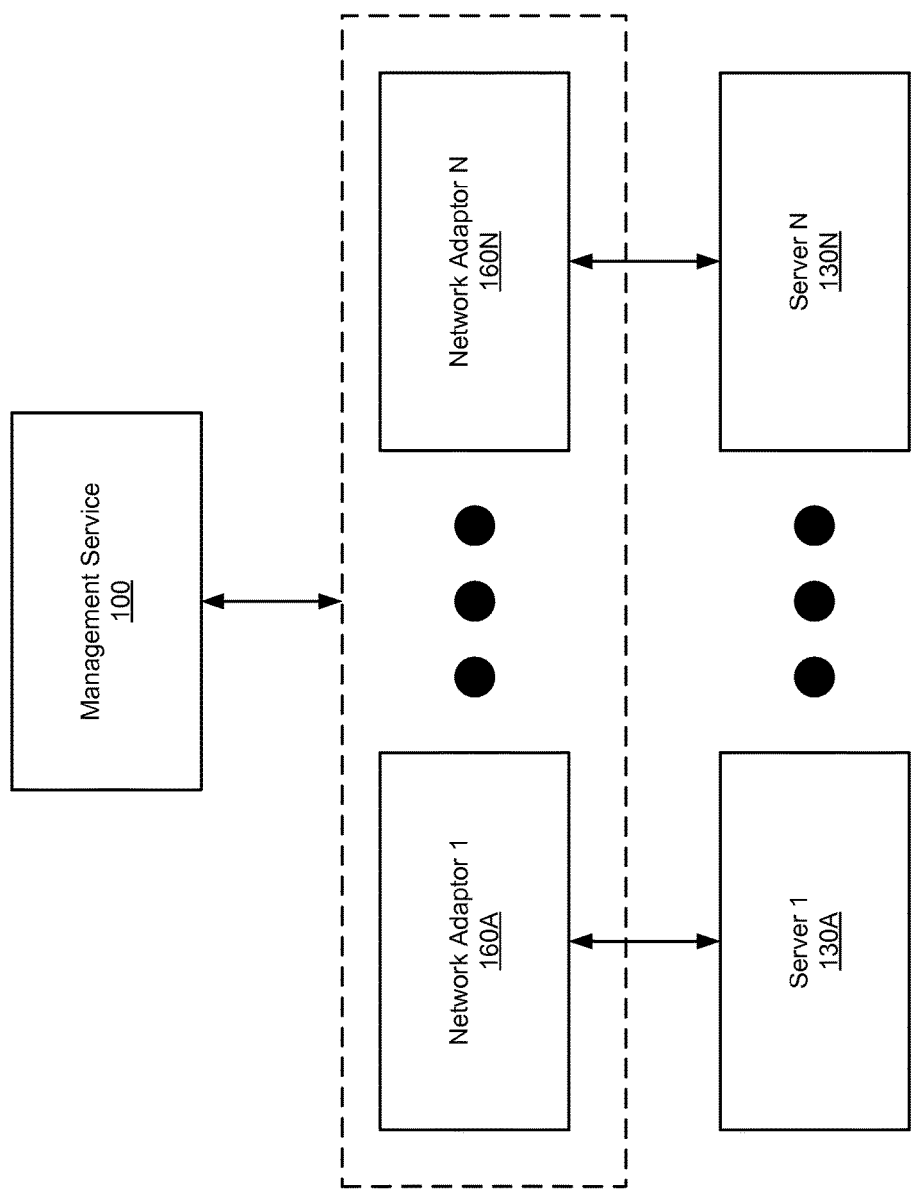
FIG. 2 shows a system in accordance with one or more embodiments of the invention.

FIG. 2 shows an alternate configuration of the system in accordance with one or more embodiments of the invention. In the system shown in FIG. 2, the servers (130A, 130N) and the network adapters (160A, 160N) are physically separate components as opposed to two components located within a single physical system (i.e., in computing device (120)).

Figure 3:
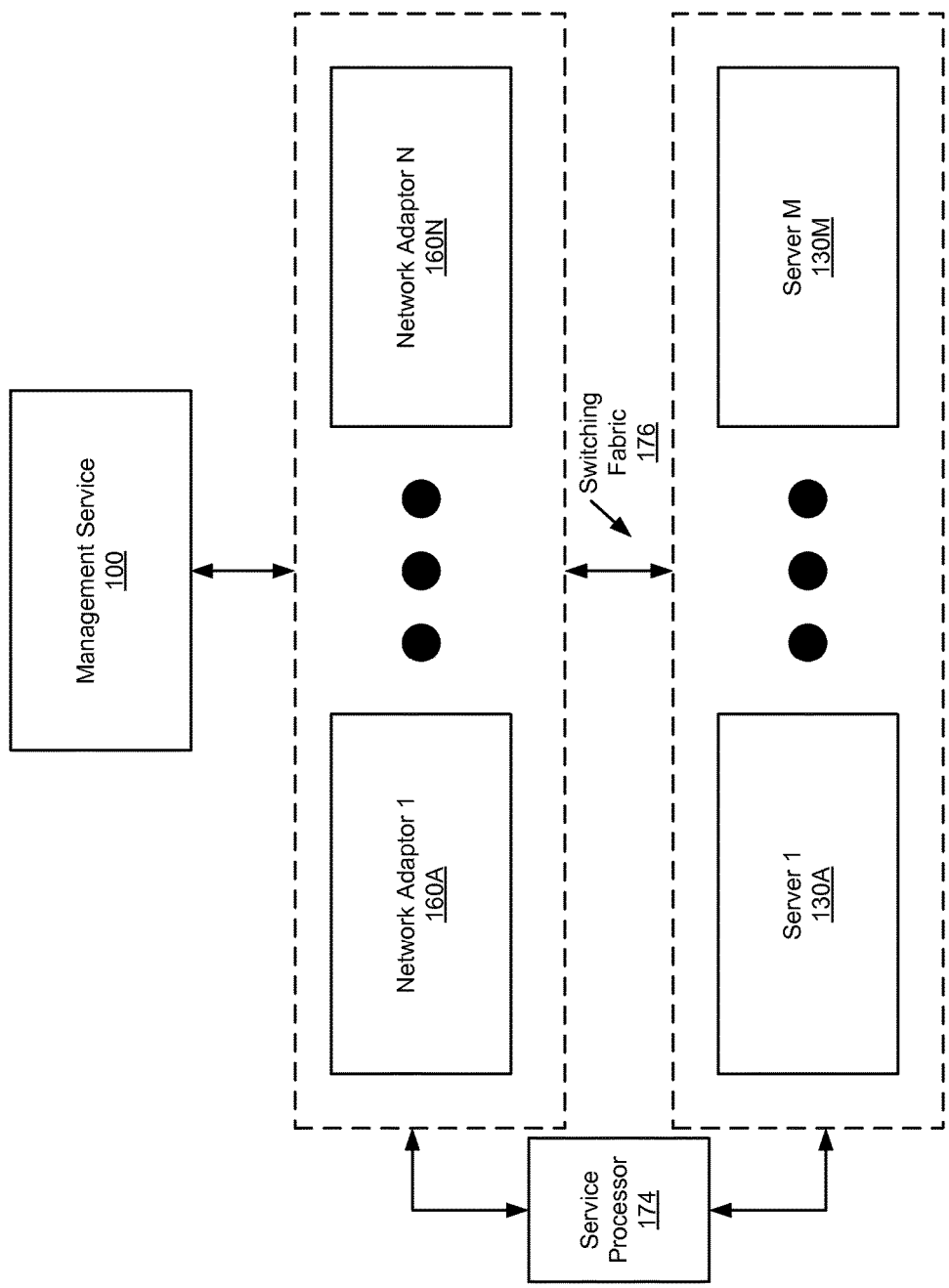
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, an application may be deployed on the computing device (120) of the system described in FIGS. 1A-3 above. The application may be a set of machine-readable instructions executing on the computing device. In one embodiment of the invention, the application may be accessed by a user via a client software module (described below). The application may be, for example, a database application hosted by the computing device, and the client software module may be a database frontend that enables the user to interact with the database content. Prior to establishing a connection to the application, the client software module may require the application, hosted by the computing device, to prove its identity. In one embodiment of the invention, the application presents a digital certificate to the client software module in order to prove the application's identity. In one embodiment of the invention, the certificate is isolated from the application to prevent leakage of the certificate, while enabling the application to function normally.

In one embodiment of the invention, the digital certificate may be issued by the management service or by a certificate authority. The digital certificate certifies that a given public key is owned by the entity that is listed in (or that is the subject of) the digital certificate. The digital certificate allows third parties to rely upon signatures (or assertions) that are generated using a private key that corresponds to the public key in the digital certificate. In one embodiment of the invention, the digital certificate confirms to the X.509 standard. The digital certificate may confirm to other standards without departing from the invention.

Figure 4:
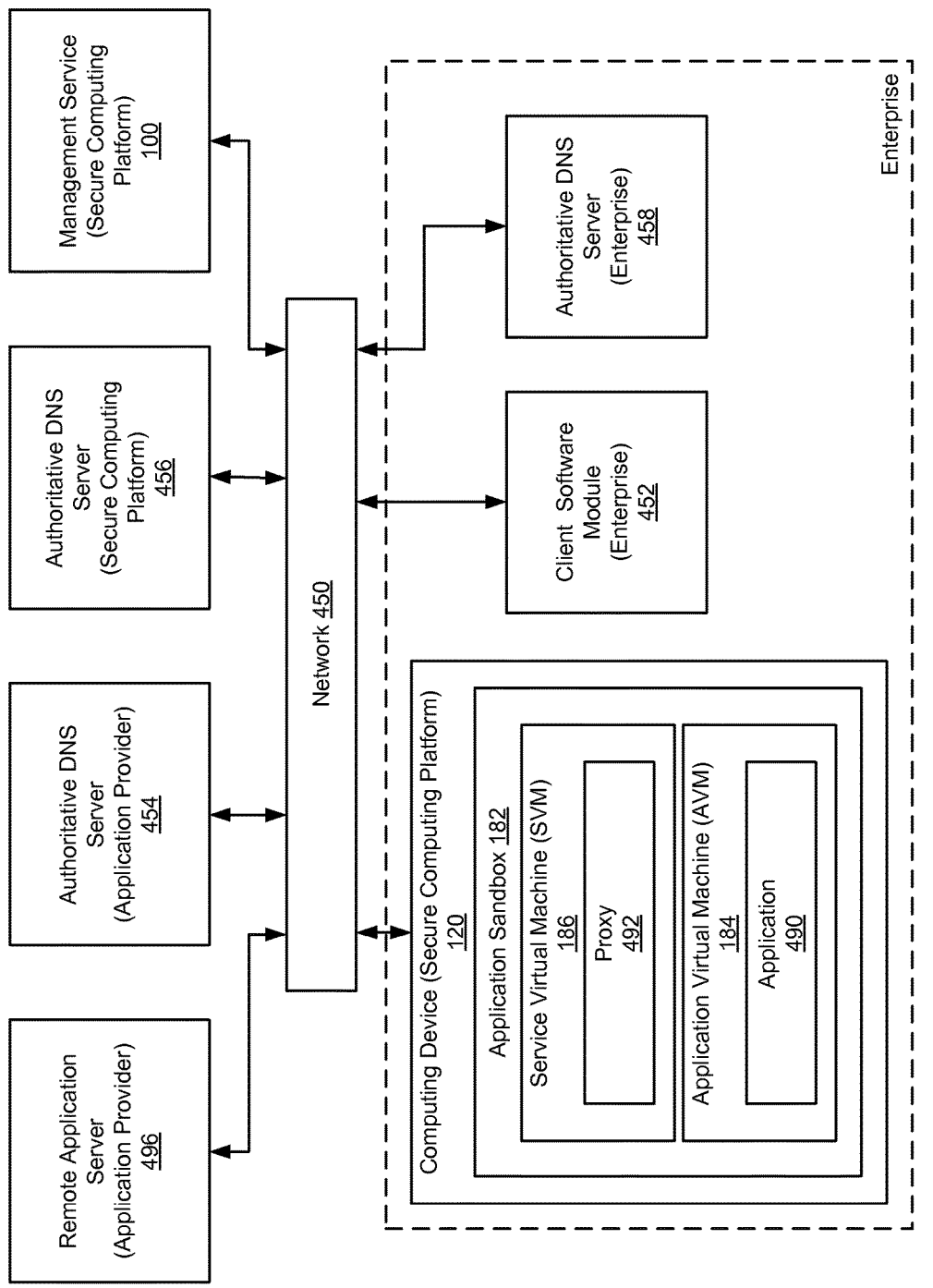
FIG. 4 shows a system in accordance with one or more embodiments of the invention.

FIG. 4 shows various components of the system previously described in FIGS. 1A-3 that may be used to safely deploy a software application and the associated digital certificate on the computing device (120). More specifically, FIG. 4 shows the computing device after the application (490) has been deployed. The other components of the system (while present) are omitted from FIG. 4 for purposes of clarity.

Turning to FIG. 4, as previously described, the computing device (120) provides a secure computing platform for hosting software applications after the management service (100) has verified the integrity of the computing device (120).

In one embodiment of the invention, the AVM (184) in the application sandbox (182) hosts an application (490). The application (490) may be any set of machine-readable instructions suitable for execution within the AVM (184). The application (490) may be, for example, an application provided as software as a service (SaaS) (e.g., an word processing software application that is centrally provided to users within an enterprise), a database, etc. The application may have been provided by an application provider who may also operate a remote application server (496), further described below.

In one embodiment of the invention, a client software module (452) may provide an application frontend enabling a user to connect to the application (490). The client software module (452) may be any set of machine-readable instructions suitable for execution on a computing device capable of connecting to the computing device (120). The client software module (452) may be executed, for example, on a desktop computer, a laptop computer, a tablet computer, a smart phone, etc. The client software module (452) may be a standalone software module or a browser-based software module that may have been provided by the application provider, or may have been developed internally by the enterprise. In one embodiment of the invention, the client software module (452) may be under local administration, i.e., enterprise administration. In one embodiment of the invention, the client software module (452) connects to the application (490) via a network (450), further described below. In one embodiment of the invention, the client software module (452), prior to establishing a connection to the application (490), requires the application (490) to prove its identity by presenting a valid digital certificate.

In one embodiment of the invention, the SVM (186) hosts a proxy (492). The proxy (492), in accordance with one embodiment of the invention, may be a set of machine-readable instructions suitable for execution within the SVM (186), designed to isolate the digital certificate, required by the client software module (452) when connecting to the application (490). Accordingly, when the client software module (452) initiates a connection to the application (490), the proxy (492) may handle the presentation of the digital certificate to the client software module (452) in lieu of the application (490), as described in detail below, with reference to FIG. 6. In one embodiment of the invention, the proxy (492) may further perform communication protocol augmentation, for example, from HTTP to HTTPS, as further described in detail below, with reference to FIG. 6.

In one embodiment of the invention, a remote application server (496) provides an application image that may be deployed in the application sandbox (182) of the computing device (120). The remote application server (496) may be a server under the administration of the software application developer or software vendor. Alternatively, in embodiments of the invention, where the software application is provided internally by enterprise, the application server (not shown) may be an enterprise internal-server under the management of the enterprise administration. The image, after deployment in the sandbox (182) may become the application (490), hosted by the AVM (184), when instantiated. The details of the deployment process are described below, with reference to FIG. 5.

In one or more embodiments of the invention, the system includes a domain name system (DNS) server (or multiple DNS servers). The DNS server may be a combination of hardware and software that implements web address (or Uniform Resource Locator (URL)) resolution. The DNS server may, for example, identify the Internet Protocol version 4 (IPv4) or IPv6 address corresponding to a human-readable URL. In one embodiment of the invention, the DNS server may directly provide the IP address. Alternatively, in one embodiment of the invention, the DNS server may direct the request to another DNS server. A domain resolution request may be forwarded from one DNS server to another DNS server until the request reaches a DNS server that is capable of resolving the domain name. In one embodiment of the invention, the DNS server may further resolve an alias domain name (CNAME). In one or more embodiments of the invention, the client software module (452) may rely on a DNS server to locate the computing device that hosts the application (490) the client software module (452) is attempting to reach. The details of the domain name resolution performed for the client software module are described below with reference to FIG. 6.

In one embodiment of the invention, a DNS server (456) managed by the secure computing platform administrator is the authoritative DNS for the secure computing platform domain, i.e., the DNS that has been configured to resolve secure computing platform domain-specific addresses. The details of the use of the secure computing platform domain authoritative DNS server are described below with reference to FIGS. 5, 6, and 7A.

In one embodiment of the invention, a DNS server (454), managed by the application provider, is the authoritative DNS for the application provider domain, i.e., the DNS that has been configured to resolve application provider domain-specific addresses. The details of the use of the application provider domain authoritative DNS server are described below with reference to FIGS. 5, 6, and 7B.

In one embodiment of the invention, a DNS server (458), operated by the enterprise, is the authoritative DNS for the enterprise domain, i.e., the DNS has been configured to resolve enterprise domain-specific addresses. The details of the use of the enterprise domain-specific authoritative DNS server are described below with reference to FIGS. 5, 6, and 7C.

In one or more embodiments, the management service (100), the computing device (120), the client software module (452), the remote application server (496) and the authoritative DNS server(s) (454-458) are interconnected by a network (450). The network (450) may include network infrastructure, for example, routers, switches, wiring, etc., within the boundaries of the enterprise, and outside the boundaries of the enterprise. Depending on the location of the communicating parties, network communications may remain within the boundaries of the enterprise, or they may cross the enterprise boundaries. In one or more embodiments of the invention, any of the network infrastructure components may be compromised. Accordingly, any communication between any of the participating parties (i.e., the management service (100), the computing device (120), the remote application server (496), and the client software module (452)) may be intercepted or altered by $3^{rd}$ parties with malicious intent. Accordingly, in accordance with one embodiment of the invention, any communication between any of the participating parties may be encrypted if sensitive information, such as a user name and/or a password, is exchanged. In one embodiment of the invention, for example public-private pairs of keys may be used to protect sensitive information. Further, in accordance with one or more embodiments of the invention, any communication between any of the participating parties may be protected against tampering, in order to ensure that alterations of a communication by a $3^{rd}$ party with malicious intent are detected. In one embodiment of the invention, fingerprints (e.g., SHA-1 or SHA-2 hash values) may be used to verify that information transmitted between the management service (100), the computing device (120), and the remote application server (496) is genuine.

One skilled in the art will recognize that the architecture of a system is not limited to the components shown in FIGS. 1A-4. For example, the system may include multiple computing devices, a computing device may include multiple application sandboxes, an application sandbox may include multiple applications. Further, the system may include multiple client service modules that may connect to the application. The system may also include multiple computing devices running the same application, for example, for purposes of redundancy. Depending on the configuration, the system may include only one authoritative DNS server, or it may include multiple authoritative DNS servers that may be authoritative for the same or for different domains. Further, additional DNS servers (e.g., recursive DNS servers), within and outside the boundaries of the enterprise may participate in the domain name resolution, in addition to the authoritative DNS servers shown in FIG. 4.

Figure 5:
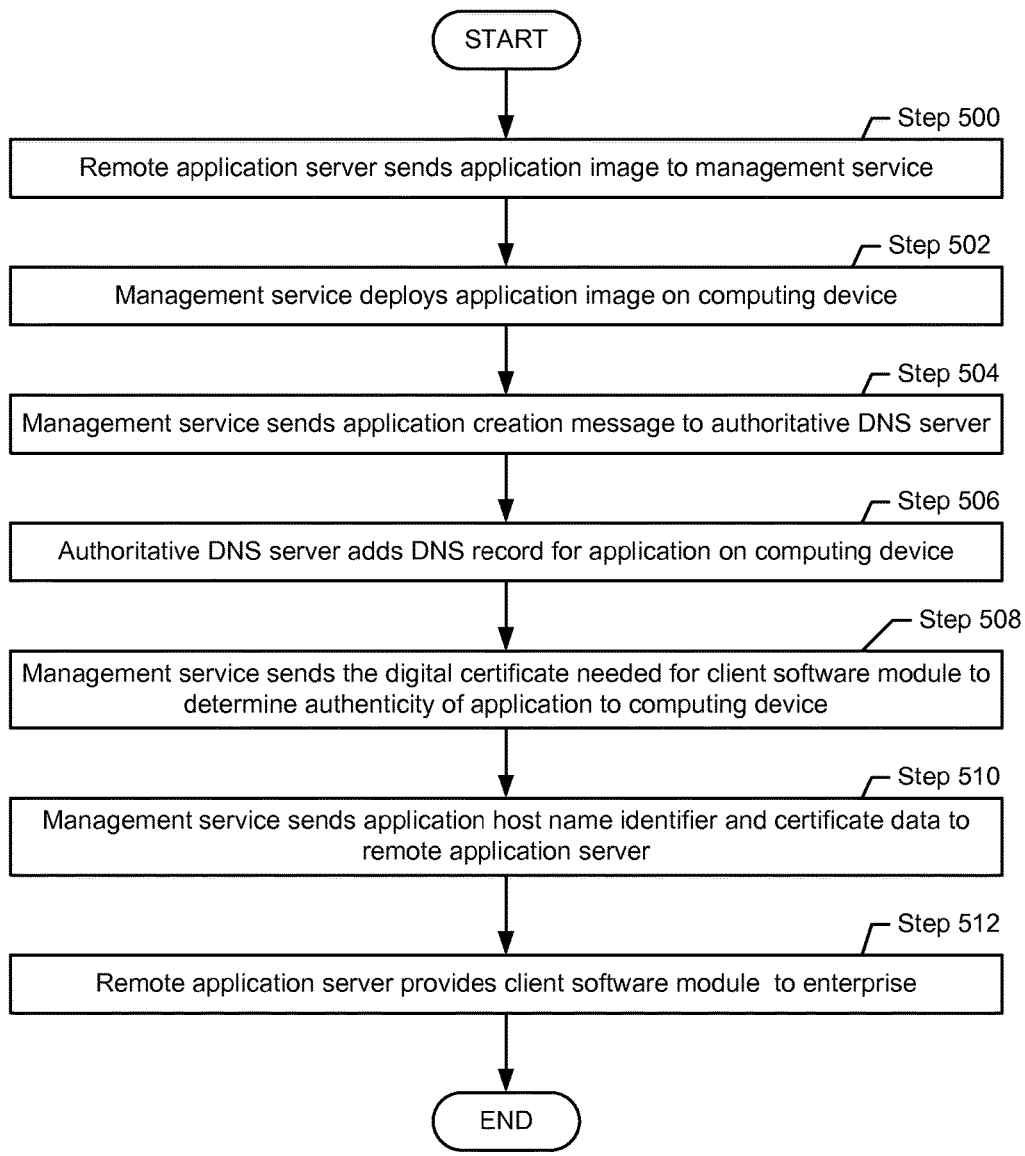
FIG. 5 shows a flowchart in accordance with one or more embodiments of the invention.
Figure 6:
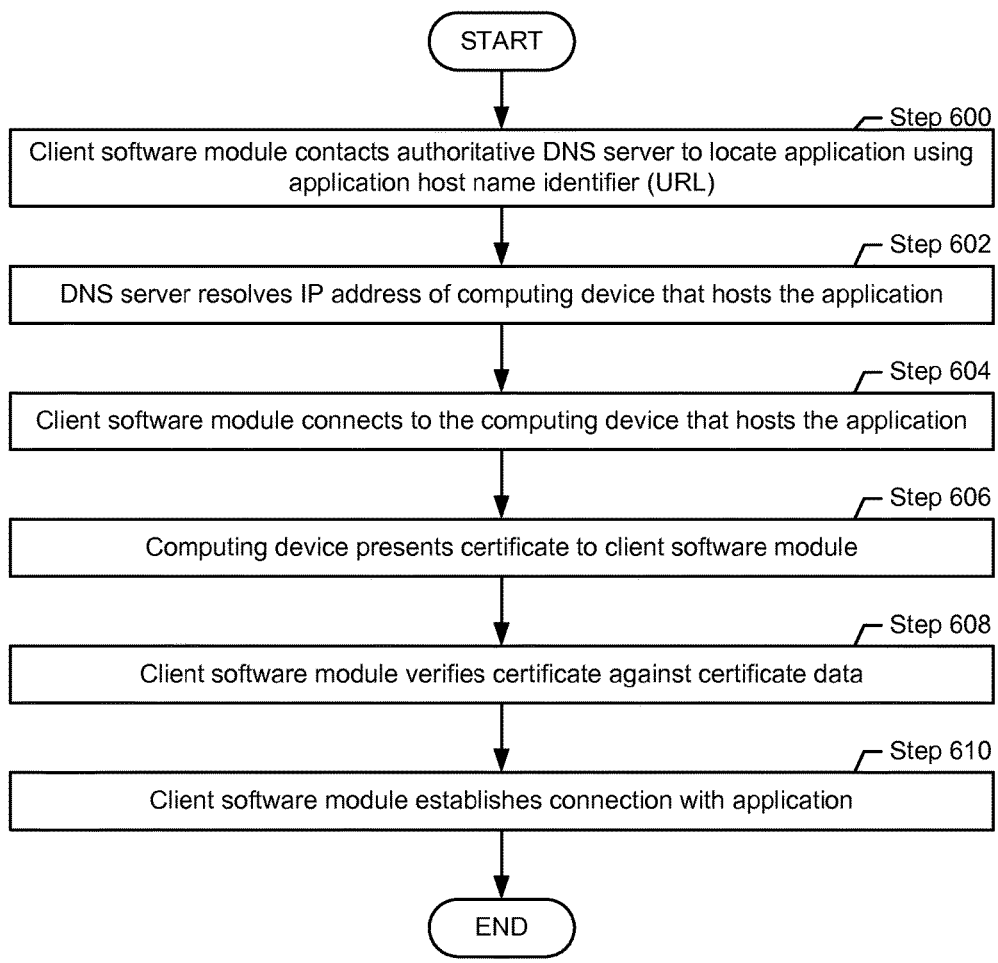
FIG. 6 shows a flowchart in accordance with one or more embodiments of the invention.

FIGS. 5 and 6 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 5 and 6 may be performed in parallel with any other steps shown in FIGS. 5 and 6 without departing from the invention.

FIG. 5 shows a method for deploying an application and the associated digital certificate(s) on a computing device, in accordance with one or more embodiments of the invention. In one embodiment of the invention, an application may be deployed in order to provide a new application to users within the enterprise. Alternatively the deployment may be performed in order to update an existing application, and/or to replace the digital certificates that are associated with the application. Depending on the type of deployment, only certain steps of the method described in FIG. 5 may be performed. Further, different system configurations may require different deployment parameters. FIG. 5 describes the details of three different configurations with reference to the example systems shown in FIGS. 7A-7C. In the example shown in FIG. 7A, the URL of the application, given to the client software module is in the domain of the secure computing platform (e.g., the domain may be "secure_platform.com"). Accordingly, the client software module attempt to connect to "application.secure_platform.com" in order to reach the application. In the examples shown in FIGS. 7B and 7C, the URL of the application, given to the client software module is in the domain of the application provider (e.g., the domain may be "asp.com"). Accordingly, the client software module may attempt to connect to "application.asp.com" in order to reach the application.

In one or more embodiments of the invention, a prerequisite for executing the method described in FIG. 5 is that the management service has verified the integrity of the computing device (as discussed above).

Turning to FIG. 5, in Step 500, the remote application server sends the application image to be deployed in a sandbox of the computing device to the management service. In one embodiment of the invention, the application image does not include the digital certificates that are associated with the application. Alternatively, in one embodiment of the invention, the application includes a placeholder certificate, i.e., a digital certificate that is not valid for identity verification of the application. The placeholder certificate may appear to the application (and other processes on the computing device) to be a valid digital certificate.

In Step 502, the management service deploys the application on the computing device. In one embodiment of the invention, the management service may configure the application sandbox and the AVM with a set of entitlements, credentials, etc., to enable the application to be installed on the computing device.

In Step 504, the management service sends an application creation message to the authoritative DNS (which, as previously described may be authoritative for either the secure computing platform domain, the application provider domain, or the enterprise domain). In one embodiment of the invention, the application creation message includes an application host name identifier (also referred to as a URL) that uniquely identifies the application to be deployed on the computing device. The request may also include a second URL to which the application host name identifier is being mapped (described below).

In Step 506, one of the authoritative DNS servers adds a DNS record for the application to be deployed. In one or more embodiments of the invention, the content of the DNS record depends on the domain over which the DNS server is authoritative. The choice of the DNS server to be updated with the additional DNS entry depends on the configuration of the client software module.

If the client software module is configured to contact the application in the domain of the secure computing platform (e.g., by contacting "application.secure_platform.com"), a DNS record is added to the authoritative DNS server for the secure platform. The added DNS record may be a CNAME entry (i.e., an alias) that redirects any request made for "secure_platform.com" to the local domain used by the enterprise ("e.g., acmecorp.com"), where the computing device that hosts the application is located. Continuing with the above example, the added CNAME record is: "secure_platform.com=acmecorp.com". Using this CNAME record, a request for the application, made by the client software module in the "secure_platform.com" domain, is redirected to the acmecorp.com domain. For example, if the client software module attempts to connect to the URL "application.secure_platform.com", the authoritative DNS server for the secure platform may resolve the name to "application.acmecorp.com". This configuration may apply to the example system shown in FIG. 7A.

If the client software module is configured to contact the application in the domain of the application provider, (e.g., by contacting "application.asp.com"), at least two alternative configurations are possible.

In a first possible configuration, a DNS record is added to the authoritative DNS server of the application provider. The added DNS record may be a CNAME entry (i.e., an alias) that redirects any request made for "asp.com" to the local domain used by the enterprise ("e.g., acmecorp.com"), where the computing device that hosts the application is located. Continuing with the above example, the added CNAME record is: "asp.com=acmecorp.com". Using this CNAME record, a request for the application, made by the client software module in the "asp.com" domain, is redirected to the acmecorp.com domain. For example, if the client software module attempts to connect to the URL "application.asp.com", the authoritative DNS server of the application provider may resolve the name to "application.acmecorp.com". This configuration may apply to the example system shown in FIG. 7B.

In a second possible configuration, an entry that redirects any request to resolve "application.asp.com" to the IP address of the computing device is added to the cache of the authoritative DNS server of the enterprise. The authoritative DNS server of the enterprise is the DNS server that is contacted first when a URL needs to be resolved within the enterprise. The authoritative DNS server of the enterprise may rely on entries in its cache to resolve domain names for which is it is not the authoritative DNS. Continuing with the above example, the entry that resolves "application.asp.com" to the IP address of the computing device was artificially injected into the cache (e.g., using DNS spoofing). Accordingly, the DNS server of the enterprise may redirect the client software module, attempting to connect to the URL "application.asp.com", directly to the computing device using the IP address in the cache. This configuration may apply to the example system shown in FIG. 7C.

In Step 508, the management service sends the digital certificate to be used by the application for identity verification to the computing device. In one embodiment of the invention, the digital certificate is stored by the proxy of the computing device in order to isolate the digital certificate from the application. In one or more embodiments of the invention, the content of the digital certificate depends on the URL the client software module is configured to use when attempting to contact the application.

Continuing with the examples described in step 508, if the URL (also referred to as the application host name identifier) used by the client software module to contact the application is in the "secure_platform.com" domain (e.g., FIG. 7A), the digital certificate is designed to correspond to the digital certificate that is expected by the client software module when the client software module connects to the application using the "application.secure_platform.com" URL. Further, if the URL used by the client software module to contact the application is in the "asp.com" domain (e.g., FIGS. 7B and 7C), the digital certificate is designed to correspond to the digital certificate that is expected by the client software module when the client software module connects to the application using the "application.asp.com" URL.

In one embodiment of the invention, the transmission of the digital certificate may be protected by encryption, for example, using a public key of a public-private key pair, provided by the computing device, for encryption on the management service, and using the corresponding private key for decryption on the computing device.

In Step 510, the management service sends the application host name identifier, established in Step 504, and certificate data to the remote application server. In one embodiment of the invention, certificate data may be a certificate fingerprint, i.e., a hash, e.g., a SHA-1 or SHA-2 hash of the digital certificate. The certificate data may be used by the client software module to verify a certificate received from the application, as further described below with reference to FIG. 6

In Step 512, the remote application server provides the client software module, configured with the application host name identifier and the certificate data, to the enterprise. For example, the client software module may be downloaded from the remote application server by a user onto the user's computing device. The downloaded client software module is pre-configured with the application host name identifier and the certificate data, in order to connect to the application, as described in detail below with reference to FIG. 6.

FIG. 6 shows a method for establishing a communication link between the client software module and the application, thus enabling a user to access the application. A prerequisite for performing the method described in FIG. 6 is that the method described in FIG. 5 has been completed. Accordingly, the client software module is pre-configured as previously described in step 512.

Turning to FIG. 6, in Step 600, a user activates the client software module. The client software module starts and subsequently contacts the authoritative DNS server in order to locate the application. In one embodiment of the invention, the software application is pre-configured with the application host name identifier (i.e., a URL) for the application to which it is attempting to connect. However, in order to contact the application, the URL needs to be resolved, i.e., the IPv4 or IPv6 address of the computing device that hosts the application needs to be identified. The client software module therefore queries a domain name server in order to obtain the IP address.

In Step 602, one of the authoritative DNS servers in the system resolves the IP address of the computing device that hosts the application. In one embodiment of the invention, the enterprise network is configured to initially direct DNS queries to the authoritative DNS server of the enterprise (i.e., the authoritative DNS server of the enterprise is the default DNS server within the enterprise network). Accordingly, the query, issued by the client software module, is directed to the authoritative DNS server of the enterprise (see e.g., solid arrow (1) in FIGS. 7A-7C). Depending on the configuration of the system, the steps performed to resolve the URL provided to the client software module may differ.

In the example where the URL the client software module needs resolved is in the domain of the secure computing platform (e.g., the domain is "secure_platform.com"), the URL to be resolved may be "application.secure_platform.com". In such cases, the client software module contacts the default DNS server (i.e., the authoritative DNS server of the enterprise) with the request to resolve "application.secure_platform.com" (see e.g., solid arrow (1) in FIG. 7A). If the query matches an entry in the cache (for example, because the same query was previously made by another application), the enterprise authoritative DNS server may directly return the IP address to the client software module (see e.g., solid arrow (4) in FIG. 7A). If the query does not match an entry in the cache, the enterprise authoritative DNS server performs recursive resolution by forwarding the query to the appropriate authoritative DNS, i.e., the authoritative DNS server for the domain "secure_platform.com" (see e.g., solid arrow (2) in FIG. 7A). The secure computing platform authoritative DNS server performs DNS resolution using the CNAME entry added in Step 506. Accordingly, the secure computing platform DNS server returns "acemecorp.com" to the enterprise authoritative DNS server (see e.g., solid arrow (3) in FIG. 7A). The enterprise authoritative DNS server is now capable of resolving "acmecorp.com" and provides the IP address corresponding to the URL to the client software module (see e.g., solid arrow (4) in FIG. 7A).

In the example where the URL the client software module needs resolved is in the domain of the application provider (e.g., the domain is "asp.com"), the URL to be resolved may be "application.asp.com". In such cases, the client software module contacts the default DNS server (i.e., the authoritative DNS server of the enterprise) with the request to resolve "application.asp.com" (see e.g., solid arrow (1) in FIGS. 7B and 7C).

Depending on the configuration of the system, the resolution of "application.asp.com" may be performed as follows.

In the example where an authoritative DNS server under the administration of the application provider is configured to resolve the URL (FIG. 7B), the resolution is performed as follows: (i) if the query of the client software module received by the enterprise authoritative DNS server matches an entry in the cache of the enterprise authoritative DNS server, the enterprise authoritative DNS server may directly return the IP address to the client software module (see e.g., solid arrow (4) in FIG. 7B); (ii) if the query does not match an entry in the cache, the enterprise authoritative DNS server performs recursive resolution by forwarding the query to the appropriate authoritative DNS, i.e., the authoritative DNS server for the domain "asp.com" (see e.g., solid arrow (2) in FIG. 7B). The application provider authoritative DNS server performs DNS resolution using the CNAME entry added in Step 506. Accordingly, the application provider authoritative DNS server returns "acemecorp.com" to the enterprise authoritative DNS server (see e.g., solid arrow (3) in FIG. 7B). The enterprise authoritative DNS server is now capable of resolving "acmecorp.com" and provides the IP address corresponding to the URL to the client software module (see e.g., solid arrow (4) in FIG. 7B).

In the example where an entry that redirects requests made for the "asp.com" domain to the acmecorp.com domain has been placed in the cache of the enterprise authoritative DNS server (e.g., using DNS spoofing), the enterprise authoritative DNS server may be able to resolve the URL provided by the client software module. The enterprise authoritative DNS server may resolve the URL without contacting any other authoritative DNS servers using the entry injected into the cache of the enterprise authoritative DNS in Step 506, and may therefore directly return the resolved IP address to the client software module (see e.g., solid arrow (2) in FIG. 7C).

Figure 7A:
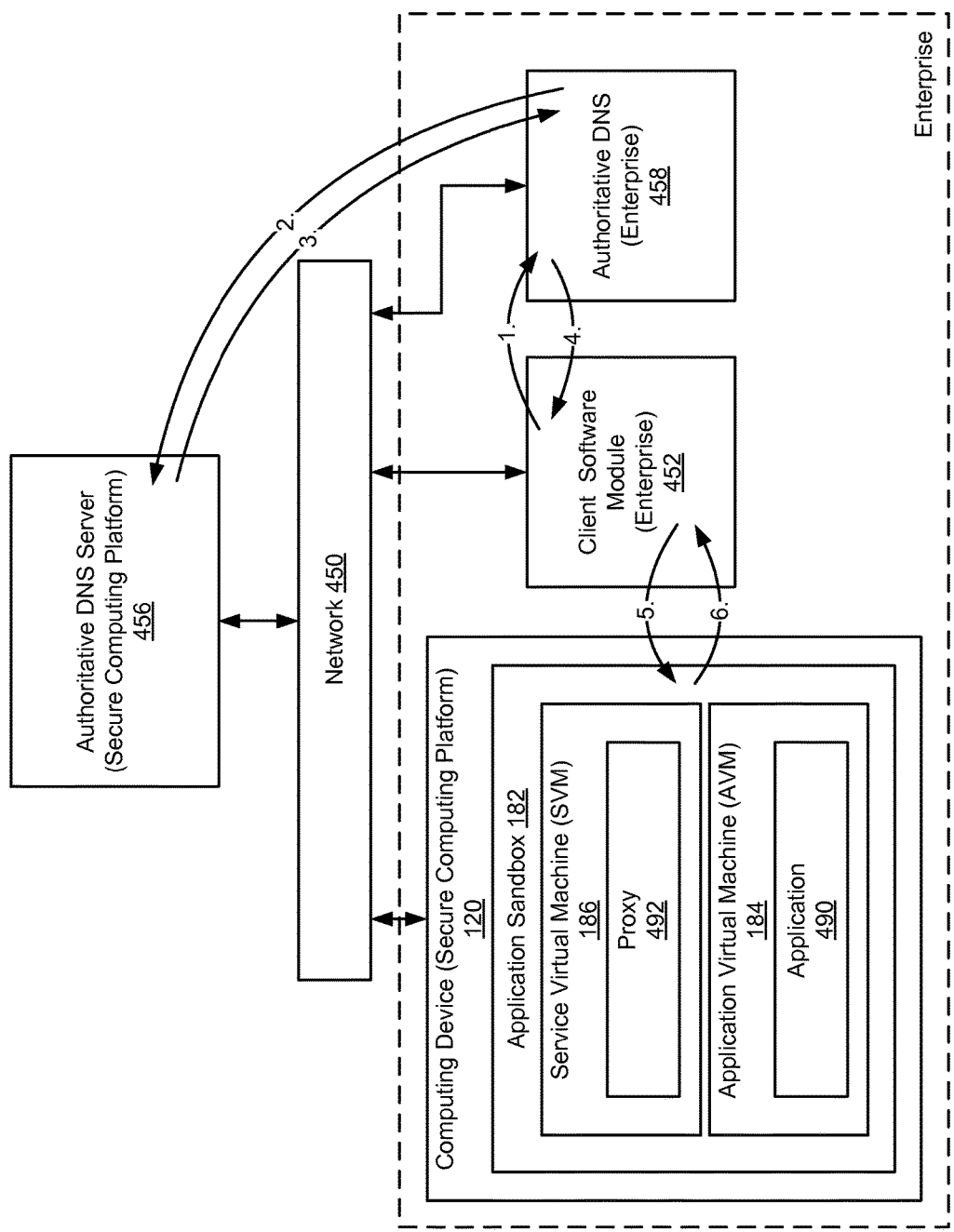
FIG. 7A-7C show systems in accordance with one or more embodiments of the invention.
Figure 7B:
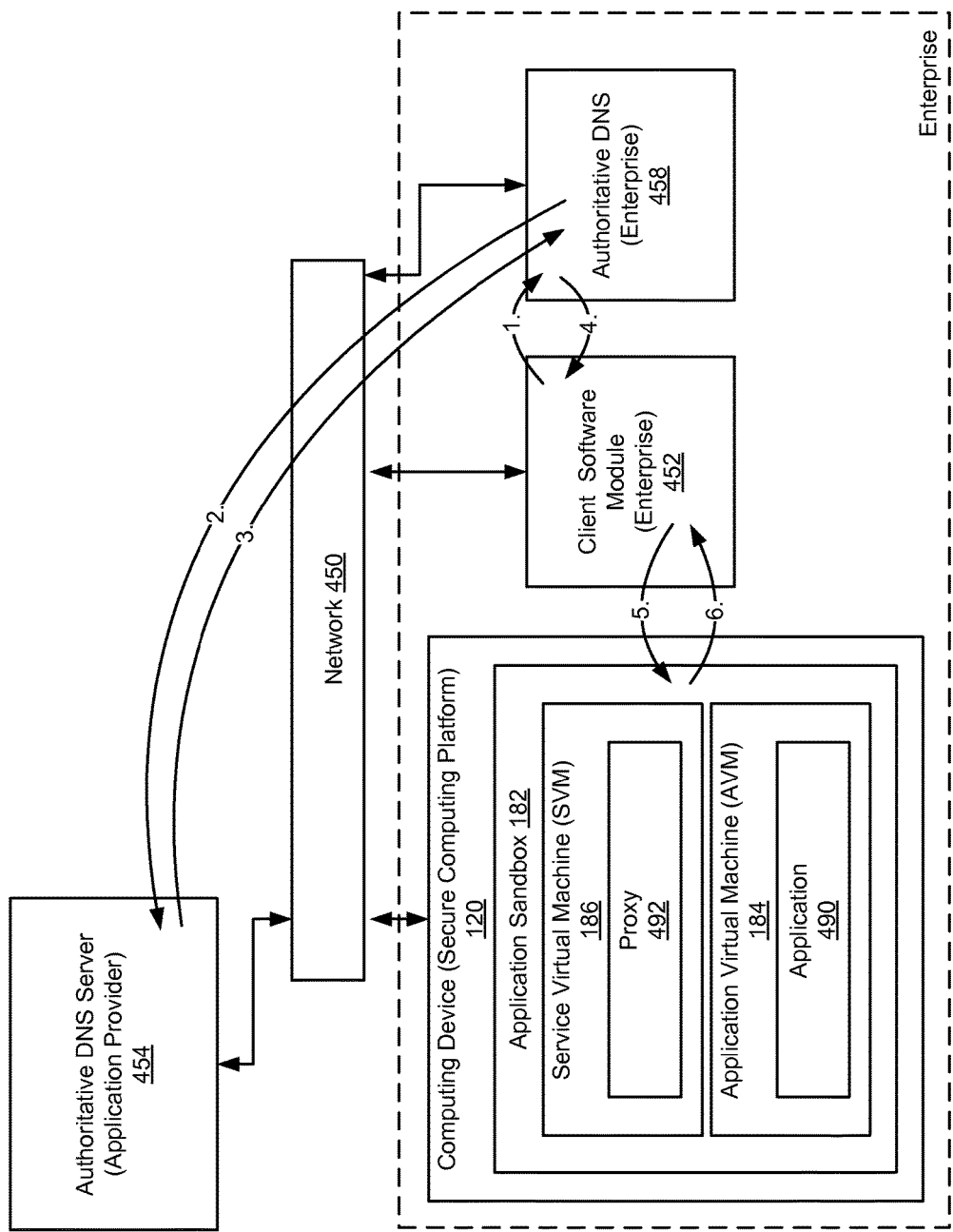
Figure 7C:
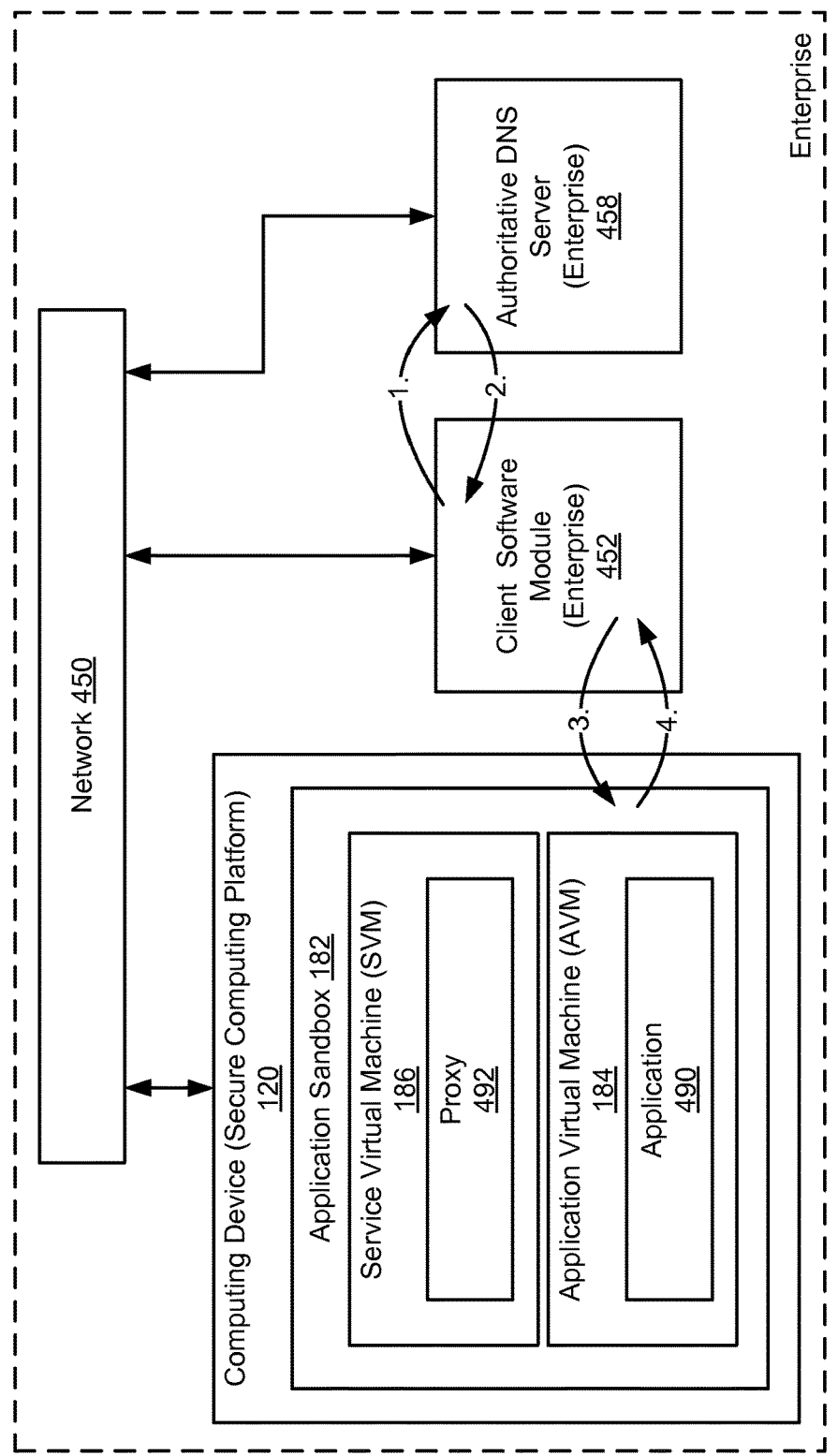

In Step 604, the client software module connects to the computing device, using the IP address received in Step 602 (see e.g., solid arrow (5) in FIGS. 7A and 7B, and solid arrow (3) in FIG. 7C). In Step 606, the computing device recognizes the request by the client software module to connect to the application. The proxy in the SVM intercepts the request and presents the digital certificate provided to the computing device in Step 508 to the client service module (see e.g., solid arrow (6) in FIGS. 7A and 7B, and solid arrow (4) in FIG. 7C). In one embodiment of the invention, the injection of the digital certificate by the proxy may be transparent, i.e., neither the application nor the client software module may be aware of the proxy injecting the digital certificate.

In Step 608, the client software module verifies the digital certificate by checking the digital certificate against the certificate fingerprint stored in the client software module. The client software module only accepts the identity of the application if the fingerprint is a valid fingerprint of the certificate.

In Step 610, the client software module establishes the connection with the application, and the user may begin accessing the application via the client software module. In one embodiment of the invention, the communication between client software module and application is performed via the proxy. The proxy, in accordance with one embodiment of the invention, performs communication protocol augmentation, for example from HTTP to HTTPS. The application may communicate using a non-secured protocol. The proxy, providing the communication interface for the application to the client software module translates the non-secured communication of the application to a secured communication via a secure communication protocol such as, for example, HTTPS. Accordingly, the communication between the application and the client software module is protected against interception even in cases where the application itself does not support secure communication protocols. In addition, communication protocol features may be selectively blocked by the proxy. For example, poorly tested, infrequently used, or unnecessary features may be blocked to further increase the protection of the application from unauthorized access.

Those skilled in the art will appreciate that the above discussion uses digital certificates and certificate data (i.e., a hash of the digital certificate) to verify the identity of the application, other methods for verifying the application may be used without departing from the invention. The following is a non-limiting set of alternative embodiments that may be implemented: (i) the client software module includes a copy of the expect digital certificate and uses this copy of the expected digital certificate to verify the digital certificate received in step 606; (ii) the client software module includes a copy of an expected public key (i.e., the public key that would be presented in the expect digital certificate) and uses this public key to verify the digital certificate received in step 606 by comparing the expected public key with the public key extracted from the received digital certificate; and (iii) the client software module includes an expected hash value of the expected public key (i.e., the public key that would be presented in the expected digital certificate) and uses this hash to verify the digital certificate received in step 606 by comparing the expected hash value with the a hash value of public key extracted from the received digital certificate.

Embodiments of the invention may enable safe, unattended deployment and operation of a software application on a computing device. Client software modules may verify the authenticity of the application, using a digital certificate presented by the application. In one or more embodiments of the invention, the digital certificate is kept isolated from the application during deployment and use of the application, such that a compromised application may not leak the digital certificate. In addition, the proxy, responsible for safeguarding the digital certificate, may also protect the communication between application and client software module by augmenting the communication protocol and/or by selectively blocking communication protocol features. Further, embodiments of the invention support a multitude of different domain name server configurations is supported in order to accommodate a broad range of applications.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deploying applications, the method comprising:
   deploying an application from an application image in an application virtual machine of a computing device, wherein the application is accessible using a first uniform resource locator (URL);
   sending an application creation message to an authoritative domain name system (DNS) server to create a record mapping the first URL to a second URL, wherein the first URL is in a first domain and the second URL is in a second domain;
   providing, to a service virtual machine (SVM) of the computing device, a digital certificate associated with the application virtual machine, wherein the service virtual machine is configured to store the digital certificate isolated from and inaccessible by the application virtual machine, and wherein the service virtual machine is separate from a certificate authority that issues the digital certificate;
   generating, by the service virtual machine and in response to one or more applications requesting communication based on the digital certificate, certificate data using the digital certificate; and
   sending, to a remote application server comprising a client software module, the second URL and the certificate data,
   wherein the client software module is configured to establish a connection to the application on the computing device using the second URL and the certificate data.

2. The method of claim 1, further comprising:
   receiving the application image from the remote application server.

3. The method of claim 1, wherein deploying the application comprises:
   providing the application image to the computing device; and
   instructing the computing device to load the application image in the application virtual machine.

4. The method of claim 1, wherein the first URL is in a secure computing platform domain, wherein the authoritative DNS server is an authoritative DNS server for the secure computing platform domain, wherein the second URL is in an enterprise domain, and wherein the application is executing within the enterprise domain.

5. The method of claim 1, wherein the first URL is in an application provider domain, wherein the authoritative DNS server is an authoritative DNS server for the application provider domain, wherein the second URL is in an enterprise domain, and wherein the application is executing within the enterprise domain.

6. The method of claim 1, further comprising:
   prior to deploying the application, verifying an integrity of the computing device.

7. The method of claim 6, wherein verifying the integrity of the computing device comprises receiving at least one integrity measurement for the computing device.

8. The method of claim 1, wherein the digital certificate conforms to the X.509 standard.

9. The method of claim 1, wherein generating the certificate data using the digital certificate comprises hashing the digital certificate.

10. A non-transitory computer readable medium comprising computer readable program code executed by a computer processor to perform the steps of:
    deploying an application from an application image in an application virtual machine of a computing device, wherein the application is accessible using a first uniform resource locator (URL)
    sending an application creation message to an authoritative domain name system (DNS) server to create a record mapping the first URL to a second URL, wherein the first URL is in a first domain and the second URL is in a second domain;
    providing, to a service virtual machine (SVM) of the computing device, a digital certificate associated with the application virtual machine, wherein the service virtual machine is configured to store the digital certificate isolated from and inaccessible by the application, and wherein the service virtual machine is separate from a certificate authority that issues the digital certificate;
    generating, by the service virtual machine and in response to one or more applications requesting communication based on the digital certificate, certificate data using the digital certificate; and
    sending, to a remote application server comprising a client software module, the second URL and the certificate data,
    wherein the client software module is configured to establish a connection to the application on the computing device using the second URL and the certificate data.

11. The non-transitory computer readable medium of claim 10, further comprising computer readable program code executed by a computer processor to perform the step of:
    receiving the application image from the remote application server.

12. The non-transitory computer readable medium of claim 10, wherein deploying the application comprises:
    providing the application image to the computing device; and
    instructing the computing device to load the application image in the application virtual machine.

13. The non-transitory computer readable medium of claim 10, wherein the first URL is in a secure computing platform domain, wherein the authoritative DNS server is an authoritative DNS server for the secure computing platform domain, wherein the second URL is in an enterprise domain, and wherein the application is executing within the enterprise domain.

14. The non-transitory computer readable medium of claim 10, wherein the first URL is in an application provider domain, wherein the authoritative DNS server is an authoritative DNS server for the application provider domain, wherein the second URL is in an enterprise domain, and wherein the application is executing within the enterprise domain.

15. The non-transitory computer readable medium of claim 10, further comprising computer readable program code executed by a computer processor to perform the step of:

prior to deploying the application, verifying an integrity of the computing device.

16. The non-transitory computer readable medium of claim 15, wherein verifying the integrity of the computing device comprises receiving at least one integrity measurement for the computing device.

17. The non-transitory computer readable medium of claim 10, wherein the digital certificate conforms to the X.509 standard.

18. The non-transitory computer readable medium of claim 10, wherein generating the certificate data using the digital certificate comprising hashing the digital certificate.

19. A method for deploying applications, the method comprising:

deploying an application image in an application virtual machine of a computing device, wherein the application virtual machine is accessible using a uniform resource locator (URL);

sending an application creation message to an authoritative domain name system (DNS) server to create a record mapping the URL to an Internet Protocol (IP) address associated with the computing device, wherein the URL is in a domain and the authoritative DNS is not the authoritative DNS server for the domain;

providing, to a service virtual machine (SVM) of the computing device, a digital certificate associated with the application virtual machine, wherein the service virtual machine is configured to store the digital certificate isolated from and inaccessible by the application virtual machine, and wherein the service virtual machine is separate from a certificate authority that issues the digital certificate;

generating, by the service virtual machine and in response to one or more applications requesting communication based on the digital certificate, certificate data using the digital certificate; and sending, to a remote application server comprising a client software module, the URL and the certificate data, wherein the client software module is configured to establish a connection to an application in the application virtual machine on the computing device using the URL and the certificate data.

20. The method of claim 19, wherein the certificate data comprises one selected from a group consisting of a hash value of the digital certificate, a hash value of a public key in the digital certificate, and the public key.

\* \* \* \* \*